United States Patent Office 3,454,614
Patented July 8, 1969

3,454,614
METHODS OF MANUFACTURING ALKALI DIALKYLALUMINATES
Hisaya Tani, Kobe-shi, and Takeo Araki and Takanobu Aoyagi, Kyoto-shi, Japan, assignors to Chiyoda Kako Kensetsu, Kabushiki Kaisha, Tokyo, Japan, a corporation of Japan
No Drawing. Filed Mar. 28, 1966, Ser. No. 537,694
Claims priority, application Japan, Mar. 29, 1965, 40/18,471
Int. Cl. C07f 5/06
U.S. Cl. 260—448   3 Claims

ABSTRACT OF THE DISCLOSURE

The preparation of alkali dialkylaluminates wherein each alkyl contains from one to four carbon atoms and is not branched in the α-position by removing saturated hydrocarbons from a reaction system containing trialkylaluminum and alkali hydroxide and their use as industrially valuable high molecular polymerization initiators.

This invention relates to a method of manufacturing alkali dialkaluminates of the general Formula I $$R_1R_2AlOM \qquad (I)$$

wherein $R_1$ and $R_2$ represent alkyl radicals having from one to 4 carbon atoms and which are not branched in the α-positon and M represents an alkali metal, particularly an alkali metal selected from the group consisting of Li and Na.

A method of producing the compounds of the above general formula has already been disclosed by a French patent (P.V. No. 879,005).

The present inventors, as a result of their efforts for development of aluminum-containing organo-metallic compounds which could be industrially valuable high-molecular polymerization initiators, have found a method of manufacturing the compounds of the general Formula I in a more industrially advantageous way than the prior method described in the French patent. They also revealed that the compounds of the above general formula have most beneficial properties as isotactic polymerization catalysts for acetaldehyde and are capable of converting the starting material into isotactic high polymers of poly-acetal type at high yields. These findings lead to the present invention.

The industrially advantageous features of the present invention will be described hereunder in comparison with the industrial disadvantages of the method of producing alkali dialkylaluminates according to the French patent.

(1) The French patent, that is, a method of manufacturing alkali dialkylaluminates is composed of producing hydrogen gas from hydrogen dialkyauminum and alkali hydroxide. It is expressly set forth that, when trialkylaluminum is used as the starting material, olefin should be produced, and hydrogen dialkylaluminum should be made as an intermediate product. In these respects the method has fatal defects for its industrial application.

Trialkylaluminum compound having higher alkyl radicals is readily deprived of olefins on heating, whereby to form corresponding hydrogen dialkylaluminum compounds, but it causes great difficulties in converting trialkylaluminum compound containing lower alkyl radicals which have from one to four carbon atoms and are free from substituent in the α-position into hydrogen dialkylaluminum compounds quantitatively by the removal of olefins.

It is known, for example, that triethylaluminum will be only partially converted into hydrogen diethylaluminum on heating at from 160° to 180° C. under reduced pressure for many hours. (K. Ziegler: "Organoaluminum Compounds" in "Organometallic Chemistry" ed. H. Zeiss, Reinhold Publishing Corp., 1960, p. 216.)

Experiments by the present inventors proved that Zeigler is correct and exact in his conclusion.

Indeed, it has been known little about the possibility of converting trialkylaluminum, containing lower alkyl radicals which are free from any substituent in the α-position and have from one to four carbon atoms, into hydrogen dialkylaluminum in an industrially advantageous way. In order to obtain this type of hydrogen dialkylaluminum compounds, it is usually necessary either to effect the reaction of dialkylaluminum halogenide and alkali hydride or to treat trialkylaluminum in the presence of both metallic aluminum and hydrogen gas.

As will be seen from the foregoing, it involves so many production steps that serious disadvantages are inevitable from the industrial standpoint, if the method revealed by the French patent is applied to the manufacture of alkali dialkylaluminates from trialkylaluminum compounds containing alkyl radicals which have from one to four carbon atoms and are not branched in the α-position.

According to the present invention, alkali dialkylaluminates are prepared in such manner that a desired compound is obtained directly from a reaction system containing trialkylaluminum and alkali hydroxide by removal of saturated hydrocarbons therefrom, without the necessity of producing hydrogen dialkylaluminum as an intermediate product. The industrial advantages of the present invention include an ecomony achieved by omission of one production step of the prior method, a safety in operation provided by the inhibition of production of explosive and highly dangerous hydrogen gas, and a remarkable increase in the yield of desired product.

(2) While the French patent confines in its description the possible industrial applications of alkali dialkylaluminates merely to catalytic use in the manufacture of alkylaluminum compounds from olefins, hydrogen, and metallic aluminum, the present inventors have found that the compounds can be excellent initiators for isotactic polymerization of acetaldehyde. This greatly adds to the significance of the novel method of manufacturing alkali dialkylaluminates.

Manufacture of alkali dialkylaluminates in accordance with the invention is accomplished by paying attention to the following points:

Alkali dialkylaluminates form complex compounds with unreacted trialkylaluminums in a molar ratio of 1:1 and make them inactive. In the method of the invention, therefore, it is advisable to control the amount of trialkylaluminums lest it should become excessive.

The solvents used for the present invention may be selected from the group consisting of organic solvents which will not react irreversibly with trialkylaluminum. Aromatic hydrocarbons such as toluene and xylene provide the most satisfactory results, while aliphatic hydrocarbons such as pentane, hexane, heptane and ligroin are also very good for the purpose. Polar solvents such as ethers, tetrahydrofuran and anisole may also be used for this purpose but the aforesaid hydrocarbons are preferred.

When M is lithium in the general formula of the objective compound, the present invention gives the best result with a combination of triethylaluminum. Other combinations also give the objective compounds.

The present invention is illustrated by the following examples.

EXAMPLE 1

In a vessel in which the air was replaced by $N_2$, 10 g. of thoroughly dried lithium hydroxide were suspended in 100 ml. of toluene, and the suspension was heated to 80° C. with thorough agitation.

Into the suspension, a toluene solution containing 38 g. of triethylaluminum and which was kept at 70° C. was gradually dropped with continuous stirring. The reaction proceeded with evolution of ethane. The production of ethane gas was confirmed by gas chromatography with the use of a silica gel-containing 2 M column, the amount of hydrogen being at most one percent of the total gas. After the completion of the addition, the reaction mixture was further stirred in the reflux of toluene. The reaction terminated with dissolution of most of lithium hydroxide. When the reaction system was cooled, unreacted lithium hydroxide and crystalline $$Li(AlEt_2OAlEt_3)$$

secondarily produced were filtered away from the reaction system. After toluene was distilled off, 100 ml. of n-hexane were added to the reaction product whereby removing insoluble product. After the distillation of the n-hexane solution, a white powdery substance was formed. This product was obtained in an amount of 38.2 g., at a yield of 83%. When this product was hydrolyzed with dilute sulfuric acid, ethane gas evolved at a rate of 2 mol equivalent for each Al atom. On analysis, the percentage of Al was found to be 24.2% (against the calculated value of 25.0%) and the value found of Li was 6.28% (against 6.48%). When reacted with acetaldehyde, it gave no sec-butanol which is a Grignard's addition product, and it was confirmed that the reaction product contained no $AlEt_3$ nor $Li(AlEtOAlEt_3)$. When reacted with methyl iodide, the white powdery substance yielded lithium iodide and further one mol equivalent of methanol per Al atom was obtained on hydrolysis with dilute sulfuric acid. Hence the product was confirmed to have a composition identical with $Et_2AlOLi$.

EXAMPLE 2

The same procedure as described in Example 1 was followed except that triethylaluminum was substituted by dimethylethyl-aluminum (34 g.) and lithium hydroxide by sodium hydroxide (16 g.), and that a toluene-tetrahydrofuran mixture (1:1) was used as the solvent. In the similar manner, ethane gas evolved and sodium dimethylaluminate was produced. On hydrolysis with dilute sulfuric acid, the product gave off 2 mol equivalent of methane gas per Al atom. Analytically found values were Al 27.3% and Na 22.5% against calculated values of 28.1% and 24.0%, respectively. The yield was 37 g. (78%).

EXAMPLE 3

Into 20 ml. of toluene, 0.25 g. of lithium diethylaluminate prepared in Example 1 was dissolved and cooled together. With stirring 20 g. of acetalaldehyde were added. After sealing, the reaction tube was cooled to −78° C. and allowed to stand at the temperature for 48 hours. By the use of a little amount of methanol the reaction was terminated, and the polymer thus prepared was dipped in n-hexane for 24 hours. The n-hexane-insoluble part was regarded as the total yield, which was 17.8 g. (89%). Further, by swelling with chloroform and removal of the soluble part, 16.4 g. of a polymer remained insoluble. If the percentage of the chloroform-insoluble part in the total amount of the n-hexane-insoluble part was to represent the isotacticity percentage, the value was 92%. This meant that 82% of the monomers was converted into a crystalline polymer. By an infrared absorption spectrum, the polymer was found to have a polyacetal structure, and from an X-ray pattern it was identified to be an isotactic polymer. The product was stretchable.

EXAMPLE 4

Into 20 ml. of toluene, 0.23 g. of sodium dimethylaluminate obtained in Example 2 was dissolved. The solution when reacted with acetaldehyde in the same manner as in Example 3 gave a polymer of similar properties at a yield of 14.3 g. 71.5% g. Isotacticity percentage was 91.5% (chloroform-insoluble part, 13.1 g.).

We claim:
1. In a process for preparing alkali dialkylaluminate compounds in a reaction system containing trialkylaluminum and an alkali hydroxide, said compounds having the formula

$$R_1R_2AlOM$$

wherein $R_1$ and $R_2$ represent alkyl groups having from one to four carbon atoms and not branched in the α-position and M is an alkali metal, the improvement which comprises removing saturated hydrocarbons from said reaction system at a temperature of about 80° C.

2. The process according to claim 1 wherein said alkali metal is selected from the group consisting of Na and Li.

3. The process comprising reacting trialkyl-aluminum and an alkali hydroxide at a temperature of about 80° C. and obtaining as a result thereof a saturated hydrocarbon and an alkali dialkylaluminate having the formula $$R_1R_2AlOM$$

wherein $R_1$ and $R_2$ represent alkyl groups having from one to four carbon atoms and not branched in the α-position and M is an alkali metal.

References Cited
UNITED STATES PATENTS 3,306,923   9/1967   Wetroff et al. _____ 260—448

TOBIAS E. LEVOW, *Primary Examiner.*

H. M. S. SNEED, *Assistant Examiner.*

U.S. Cl. X.R.

252—431; 260—067